May 23, 1933. F. F. PARIS 1,910,402
SELF CLEANING SHIELD FOR ROTARY IMPLEMENTS
Filed June 24, 1932
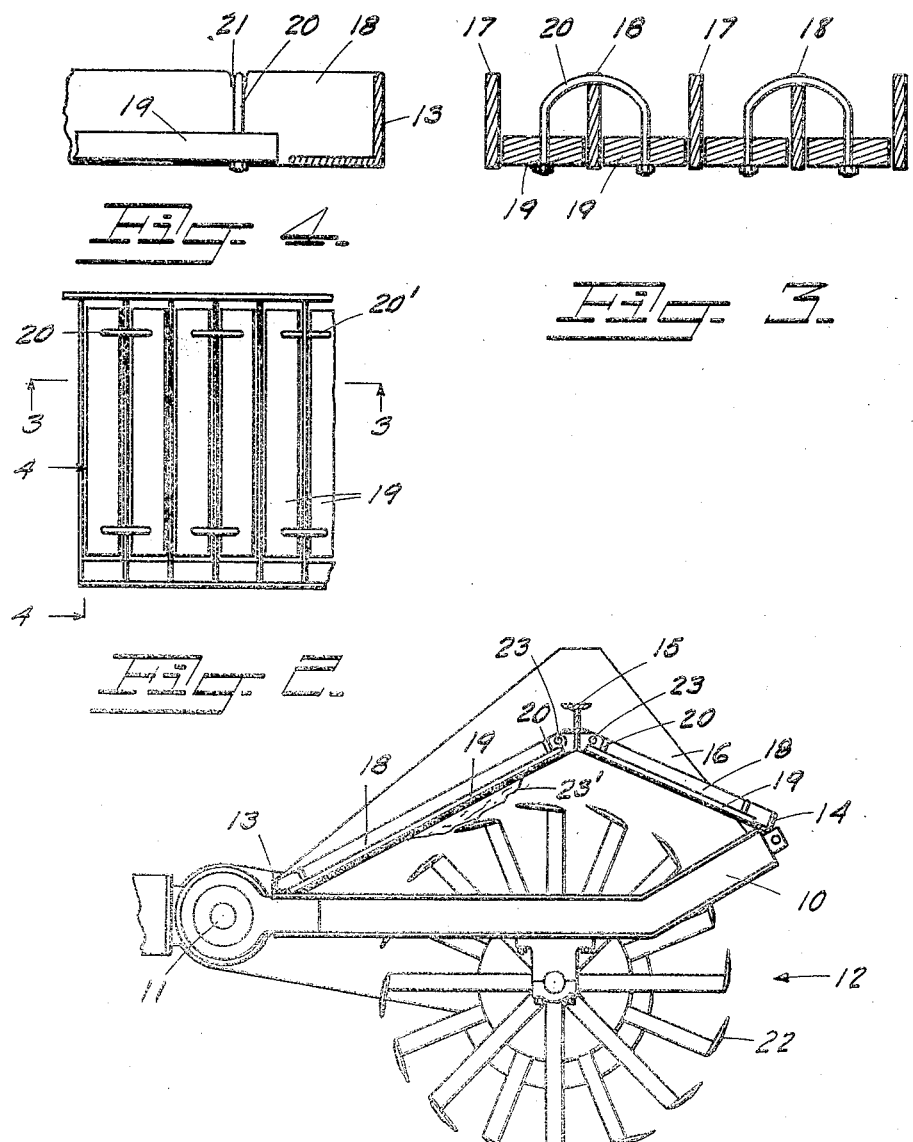
INVENTOR.
Fred F. Paris
BY Harry C. Schroeder
ATTORNEYS.

Patented May 23, 1933

1,910,402

UNITED STATES PATENT OFFICE

FRED F. PARIS, OF BERKELEY, CALIFORNIA

SELF-CLEANING SHIELD FOR ROTARY IMPLEMENTS

Application filed June 24, 1932. Serial No. 619,014.

This invention is a self-cleaning shield for rotary earth working implements and is specially adapted to the type of earth working implements in which a rotary cutting element, driven at high speed, is used for grubbing and pulverizing soil.

One of the main difficulties encountered with a device of this nature is the accumulation of earth on the undersurface of the shield, which ordinarily must be broken out by means of bars and picks which is at best a difficult and laborious procedure.

My invention provides a shield which is substantially self-cleaning and on which the accumulation of earth will form a means by which the earth is loosened through the cooperation with the rotary implement.

In addition to this, the specific and structural arrangement of the shield and its connection to the tractive device will tend to cause vibration of certain elements of the shield which also tends to loosen the accumulated earth, and further, means is provided by which the earth removing members can be oscillated or jarred manually.

The main object of the invention therefore, is to provide a self-cleaning shield for rotary earth working implements.

Another object of the invention is to provide a shield of the character outlined which, by the accumulation of earth thereon, will cause loosening of the earth by cooperation of the blades in the rotary element with the accumulated earth on the shield.

A further object of the invention is to provide a device of the character outlined in which movable elements may be manually oscillated to jarred to remove accumulated earth from the active surface of the shield.

Other objects and advantages of the invention will become apparent as the following description is read on the drawing forming a part of the specification and in which similar reference characters are used to designate similar parts throughout the several views, of which:

Fig. 1 is a side elevation of my invention as applied to a rotary earth working element.

Fig. 2 is a fragmentary plan view of a modified form of the invention.

Fig. 3 is an enlarged view taken on line 3—3 of Fig. 2.

Fig. 4 is a section taken on line 4—4 of Fig. 2.

The usual earth working implement consists of a frame 10 attached at 11 to a tractive device and by which the rotary element 12 is driven, the element 12 being rotatably mounted on the frame 10 and driven at a high speed in comparison to the forward travel relative to the device. These features are incorporated in a separate application for patent filed September 3, 1932, Serial No. 631,605, and do not form a part of this invention.

The invention consists of a shield frame comprising transverse elements 13 and 14, a ridge support 15 rigidly fixed to the frame 10, and side plates 16 which side plates extend upwardly from the frame on either side of the rotary member 12.

Fixedly secured to the members 13 and members 14 are supporting and guide members 18 and guide members 17, these members being all equally spaced throughout the entire width of the shield. The members 18 are all connected together by means of a pivot member 23, which members are suitably mounted in brackets secured to the ridge support 15, the members 13 and 14 resting freely on the frame members 10, whereby the entire unit may be raised to permit access to the top of the rotary element 12.

Disposed between the elements 17 and 18 are shaker bars 19, the shaker bars being connected in pairs by means of handles 20, which handles cooperate freely with the top surface of the supports 18 and may be retained in position in grooves 21 formed in the supports, or by other known means.

A modification is shown in Fig. 2 in which one end of one pair of the shaker bars 19 are pivotally mounted as shown at $20^1$ in Fig. 2 and which pivotal mounting consists of a U shaped rod having the legs fixed in one end of adjacent shaker bars 19, and the transverse member of the U shaped rod rotatably supported in an aperture formed in the support 18, forming a hinge, so that the bars may be lifted by the handles 20 secured in the opposite ends of the bars and still be retained in their relative position by the pivots 20¹. In this way the bars 19 may be swung about their pivots 20¹ and then by operating the rotary implement, soil will be cast through between the bars 17 and 18, thoroughly cleaning the space therebetween. This also provides a more convenient method of cleaning the shield by rapping the bars, which bars may be raised at one end by means of the handle and driven back in place.

The operation of the device is as follows: With the rotary element 12 rotating at high speed counter-clockwise as viewed in Fig. 1, the earth picked up by the blades 22 is violently cast against the undersurface of the shield, accumulating as indicated at 23¹. The vibration of the device sets up a vibratory or oscillating motion in the bars 19 which tends to shake the earth 23 free from the shield. In the event of accumulation to a point where the plates 22 are enabled to contact with the accumulated earth 23, a rebound is provided for the bars 19 on which the earth 23 adheres and this motion sets the earth free from the bars as also breaking away from the guide and support members 17 and 18.

In the event that sufficient vibration is not set up to keep the bars 19 cleared, these bars may be raised and driven back by hand to drive the accumulated earth from the surface, or the bars 19 may be removed in pairs and cleaned manually where the earth is especially tenacious, the removal of the bars being convenient as there is no locking means required and the bars are freely disposed between the members 17 and 18. Where the bars are pivoted as indicated at 20¹, the bars may readily be swung about the pivot and raised to a vertical position and the accumulated earth scraped therefrom.

Having described an operative device it will be understood that variations in construction and arrangement of parts which are consistent with the appended claims may be resorted to without detracting from the spirit or scope of the invention or sacrificing any of the advantages thereof.

I claim:

1. A self-cleaning shield for a rotary earth-working implement comprising a shield formed with a plurality of gravitationally retained elements, freely movable and adapted to be moved by cooperation of dirt accumulated thereon with the rotary earth working implement.

2. A self-cleaning shield for a rotary earth-working implement comprising a shield formed of a series of parallel, spaced apart guide and support members and freely movable members disposed between said guide and support members.

3. A self-cleaning shield for a rotary earth-working implement comprising alternate fixed and freely movable members.

4. A self-cleaning shield for a rotary earth-working implement comprising a series of alternate guide and support members, and freely movable members, said freely movable members having a surface area greater than said guide and support members.

5. A self-cleaning shield for a rotary earth-working implement comprising fixed sections and freely movable sections, said freely movable sections being adapted for oscillation when dirt is accumulated thereon, by cooperation of the rotary implement with the accumulated dirt.

6. A self-cleaning shield for a rotary earth-working implement comprising fixed sections and freely movable sections, said freely movable sections being adapted for oscillation when dirt is accumulated thereon, by cooperation of the rotary implement with the accumulated dirt.

7. A self-cleaning shield for a rotary earth-working implement comprising a hood formed of a series of spaced apart parallel guide bars, a shaker bar between each pair of guide bars, said shaker bars being freely supported by said guide bars.

8. A self-cleaning shield for a rotary earth working implement comprising spaced apart support and guide elements and interposed freely movable elements forming together a continuous shield surface.

9. In combination with a rotary earth-working implement, a shield having movable sections and freely mounted to permit vibration thereof.

In testimony whereof I affix my signature.

FRED F. PARIS.